April 4, 1944.  L. M. C. SEAMARK  2,346,052
VALVE
Filed Aug. 14, 1943  3 Sheets-Sheet 1

Fig.1ª

Inventor
L. M. C. Seamark
by
W. E. Evans
Attorney.

Patented Apr. 4, 1944

2,346,052

UNITED STATES PATENT OFFICE 2,346,052

VALVE

Lewis Mervyn Cecil Seamark, Lyme Regis, England

Application August 14, 1943, Serial No. 498,620
In Great Britain August 25, 1942

7 Claims. (Cl. 251—96)

This invention relates to rotary plug valves of the kind in which the valve is a sleeve of tubular form slotted or cut lengthwise through the valve wall from one end to the other, and adapted alternatively to be tightly held in closed or open position in the valve body, or loosely held to facilitate the movement of the valve into or out of its closed or open position.

The invention has among its objects to use such a split or slotted sleeve alone as the valve, to avoid the use of a valve plug within it as a means for its expansion, and to use one hand lever or the equivalent alone, for the rotation of the sleeve valve for opening or closing it.

The invention has also among its objects to ensure the circumferential contraction of the sleeve valve substantially uniformly throughout its length by means operating from the hand lever or the equivalent by which the valve is also opened or closed.

According to the invention the valve is provided as a split sleeve completely slotted or split lengthwise, which at the position at which it is slotted or split lengthwise is provided on the oppositely disposed faces of the slot or slit with complementary and coincident grooves adapted together to form a lengthwise cavity divided lengthwise by the slot or slit, for the reception within it of a spring device extending lengthwise of the cavity, whereby the sleeve may be expanded, and means provided for permitting the circumferential contraction and release of the sleeve in the initial movement of the valve operating hand lever or the equivalent. The complementary grooves are advantageously formed of a semicircular or partially circular transverse cross-section and the spring device advantageously takes the form of a spring forked rod having a spring fork at its upper end only, or both at its upper and its lower ends, whereby normally the valve sleeve is held expanded in the valve body under the pressure imposed between the coincident grooves within which the spring device is mounted.

According to the invention moreover the spring device may consist of a spring forked rod that many extend the length of the cavity formed by the complementary and coincident grooves on the oppositely disposed faces of the slot in the sleeve, whereby pressure is normally applied by the upwardly extending forked parts of the spring device tending to maintain the sleeve expanded.

According to the invention moreover a massive rotatable cap may be adapted to be held in position in the valve body beneath the cover plate as means for engagement of the valve sleeve at its upper end.

According to the invention moreover the massive rotatable cap may at its top face be provided with an annular recess for a packing ring, the inner circumferential face of which recess inclines upward towards the adjacent underface of the cover plate, while the outer face of the annular recess may be perpendicular and the packing ring may have a transverse radial cross-section generally corresponding in shape to that of the annular recess and an external diameter substantially less than that of the diameter of the outer face of the annular recess, whereby an annular pressure space thus surrounds the packing ring. The packing ring under the fluid pressure normally accessible to it may be forced inward against the upwardly inclined face of the annular recess and against the underface of the cover plate of the valve body. Thus the massive rotatable cap may be provided integral with the valve spindle that extends upward through the cover plate without the necessary use of gland packing.

According to the invention moreover the rotatable cap is provided in diametrically opposite positions with cavities adapted for the reception of upwardly extending parts of the sleeve of corresponding shape as means for the engagement of the sleeve for its rotation, and the lengthwise slot in the valve sleeve is located in a central plane passing through one of the upwardly extending parts of the sleeve and provision made for lost motion between the upwardly extending parts of the sleeve and the cavities of the rotatable cap, which lost motion is less in that cavity in which the upwardly extending part of the sleeve is accommodated through which the lengthwise slot extends, whereby on the rotation of the cap in one direction or the other it is contracted and the forked spring rod is compressed, the valve sleeve being thus relieved of the stress normally applied to it and the valve sleeve may be freely rotated.

According to the invention moreover a pair of pins may alternatively be mounted in substantially coincident holes bored transversely in the upwardly extending slotted part of the valve sleeve in positions near its upper end, separated by the slot, each of the pins being of such a determined length that according to the direction of rotation of the massive rotatable cap, one or other of the faces of the lateral cavities of the massive rotating cap may be engaged by the outwardly protruding end of one or other of the pins whereby it is forced inward to contact one part of the spring fork at the upper end of the forked spring rod, the valve sleeve being thus relieved of the stress normally applied to it, whereby the valve sleeve may then be moved for opening or closure on the continued rotation of the cap.

The invention comprises the construction hereinafter described.

The invention is illustrated in the accompanying drawings, in which,

Figure 1a is a detail plan view of a constructional modification of that illustrated in Figures 3 to 5.

In carrying the invention into effect as illustrated in the accompanying drawings, the valve is formed as a cylindrical tubular sleeve $a$ (Figures 1 and 2) open at its respective ends, having oppositely disposed inlet and outlet passages as at $x$. The sleeve $a$ is provided at its upper end with integral upstanding segmental parts $b$ and $c$ having oppositely disposed radial or parallel contact faces $b^1$, $b^1$ and $c^1$, $c^1$, with which may contact corresponding radial or parallel faces of corresponding segmental parts of a massive cap $f^1$, $f^1$ provided at or mounted upon the lower end of a vertically disposed valve spindle $f$ (Figures 3 to 6) that extends upward through the cover plate $g$ on the valve body.

The upstanding segmental part $b$ (Figures 1 and 2) is divided in a central position by the slot $a^1$ lengthwise of the sleeve $a$, and at the oppositely disposed contact faces of the slot $a^1$ complementary and coincident grooves $a^2$, $a^2$ are formed of a partially circular cross-section completing a hole of substantially circular cross-section lengthwise of the sleeve, for the reception of a spring forked pin $d$, the inner faces of the forked part of which incline outward from near the lower end to the upper end, at which the ends of the fork $d$ contact with the grooves $a^2$, $a^2$.

At a position advantageously lower than the middle position the spring forked pin $d$ (Figure 1) may be provided with a boss $e$ of a substantially circular shape in transverse cross-section, whereby it may make contact with the grooves $a^2$, $a^2$ in any inclined position it may assume.

Figure 1:
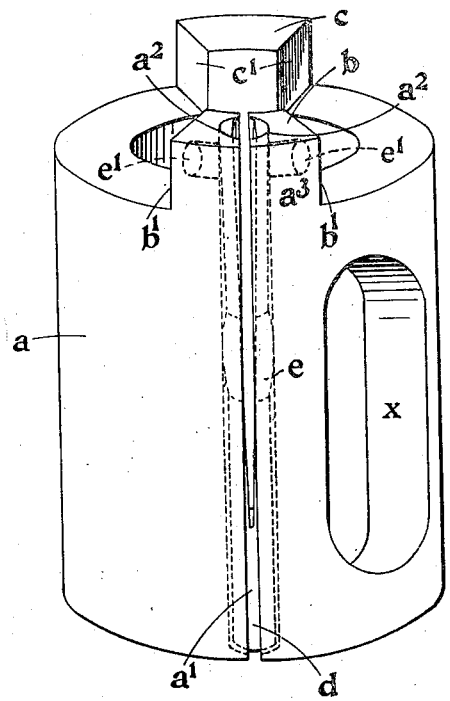
Figure 1 is a diagrammatic perspective view of a valve sleeve showing one form of forked spring device that may be used according to the invention.

Transversely disposed holes $e^1$, $e^1$ may be provided in alignment midway between the internal and external cylindrical faces of the divided segmental part $b$ of the sleeve as illustrated in Figures 1 and 1a, for the reception of pins $h$ (Figure 1a) of a length such as normally to extend beyond the radial faces $b^1$ to the extent necessary to contact one part of the spring forked pin $d$ for its compression before contact is made with one of the lateral faces $c^1$ of the segmental part $c$ of the valve sleeve. The complementary segmental parts of the massive cap $f^1$, $f^1$ are adapted for accommodation between the upstanding segmental parts $b$ and $c$ of the sleeve. Thus on the rotation in one direction of the valve spindle $f$ and the massive cap $f^1$, $f^1$ at the lower end, one of the pins $h$ is first axially displaced, while the sleeve still remains in its expanded sealed position in the cavity in the valve body, and the other pin $h$ remains in its outwardly extended position on continuing the rotation of the valve spindle. The upper forked ends $d^1$ of the forked spring rod $d$ (Figure 1) are thus brought together or into contact and the sleeve contracts, whereby the sleeve may be then rotated from or into its closed or open position.

Thus the massive rotatable cap $f^1$, $f^1$ (Figures 3, 5 and 6) has a determined extent of lost motion with respect to the divided upstanding segmental part $b$ of the valve sleeve $a$, by reason of the pins $h$, $h$ normally protruding outward from the holes $e^1$ (Figure 1) whereby the initial movement of the rotatable cap serves according to the direction of rotation of the cap, to cause the axial movement of one of the pins $h$ inwards, so that in either direction of rotation of the cap the upper forked end of the forked spring rod $d$ is thereby compressed and the valve sleeve relieved of stress, whereby the valve sleeve contracts, and the cap is thus freely rotatable within the valve body. In further rotation of the cap one of the lateral faces of one of its parts $f^1$ contacts with one of the lateral faces $c^1$ of the upstanding segmental part $c$ of the valve sleeve, whereby the valve sleeve is then freely rotated in the continued rotation of the cap. Thus the rotatable cap has a greater extent of lost motion with respect to the segmental part $c$ than with respect to the divided segmental part $b$.

In Figures 2 to 7 a modification is shown in which the pins $h$ (Figure 1a) are not used, and in which the spring rod $d$ is forked at each end and the limbs of the forked parts incline outward towards its respective ends whereby on rotation of the cap $f^1$, $f^1$ in one or other direction the lower forked part as well as the upper forked part are brought into compression, and thus the expanded sleeve $a$ is relieved of the stress normally applied by it at the lower end as well as at the upper end, and the sleeve thus contracts.

Figure 2:
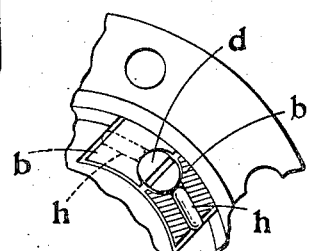
Figure 2 is a diagrammatic perspective view of a valve sleeve showing a modification of double forked spring device that may be used.
Figure 2:
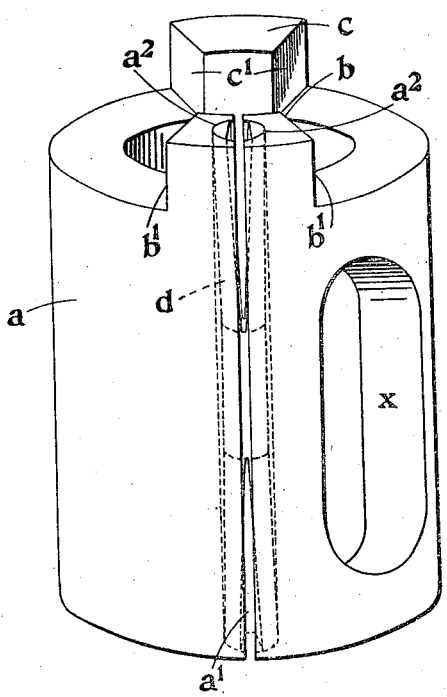
Figure 5:
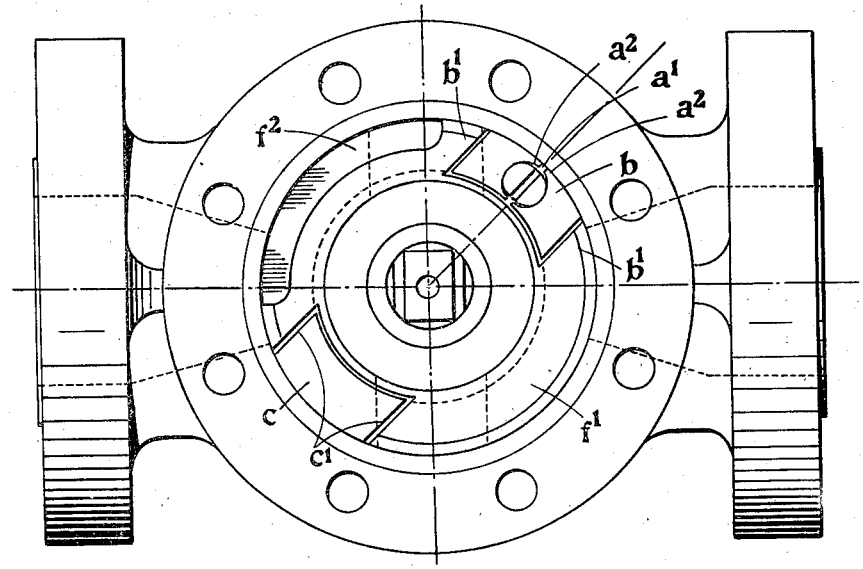
Figure 5 is a plan corresponding to Figure 3 in which the cover plate is omitted.

The massive cap $f^1$, $f^1$ in the construction illustrated in Figures 2 and 5 has also an extent of lost motion with respect to the upstanding part $c$ of the valve sleeve $a$ and a greater clearance with respect to the contacting faces $c^1$ than with respect to the contacting faces $b^1$ in order that pressure may be first applied to compress the spring device $d$ for the contraction of the valve sleeve before contact with one of the faces $c^1$ for its free rotation.

Figures 6, 7, 8:
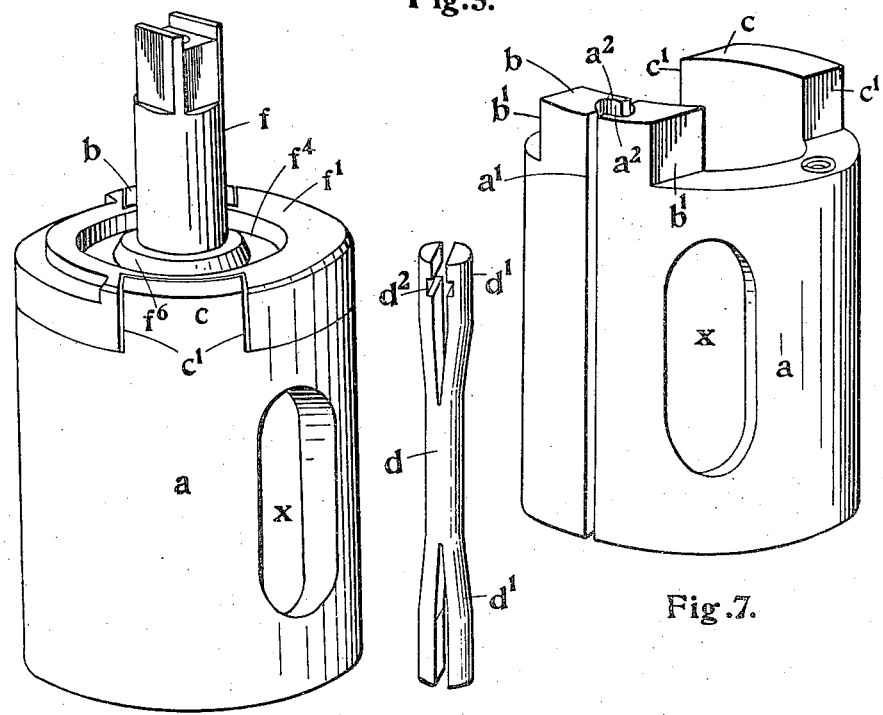
Figures 6, 7 and 8 are perspective views respectively of the valve sleeve showing the massive rotatable cap in position upon it, the valve sleeve alone, and the spring forked device.

In Figure 8 a form of spring forked rod $d$ is shown similar to that illustrated in Figure 2, in which near the upper end and on the inner faces of the forked ends transverse and oppositely disposed slots $d^2$ are formed as means for the convenient extraction of the spring forked rod $d$ from within the cavity formed by the oppositely disposed grooves in the slotted sleeve $a$.

The valve spindle $f$ is formed integral with the massive rotatable cap $f^1$, $f^1$, on the top face of which a curvilinear recess $f^2$ (Figure 3) is formed adjacent the external peripheral face of the cap, into which recess the lower end of a screw-threaded stud $f^3$ extends through the cover plate $g$, and protrudes into the recess $f^2$, whereby the screw-threaded stud may determine the open and closed positions of the valve $a$.

It will however be understood that any equivalent means may be provided to determine the extent of movement of the valve sleeve $a$ in its movement from the completely closed to the completely open position or vice versa.

The rotatable cap $f^1$, $f^1$ is also provided on its top face with an annular recess $f^4$ adapted for the reception of a packing ring $f^5$ (Figure 3), the inner circumferential face $f^6$ of which inclines upward on a conical seat towards the top face of the cap $f^1$, while the outer peripheral face of the annular recess $f^4$ is perpendicular. Thus as the packing ring $f^5$ has a transverse radial cross-section generally corresponding in shape to the annular recess $f^4$, and an external diameter substantially less than that of the outer face of the recess, an annular pressure space surrounds the packing ring $f^5$. The packing ring is thus normally forced inward against the inner conical face of the annular recess $f^4$ and against the underface of the cover plate $g$.

Figure 3:
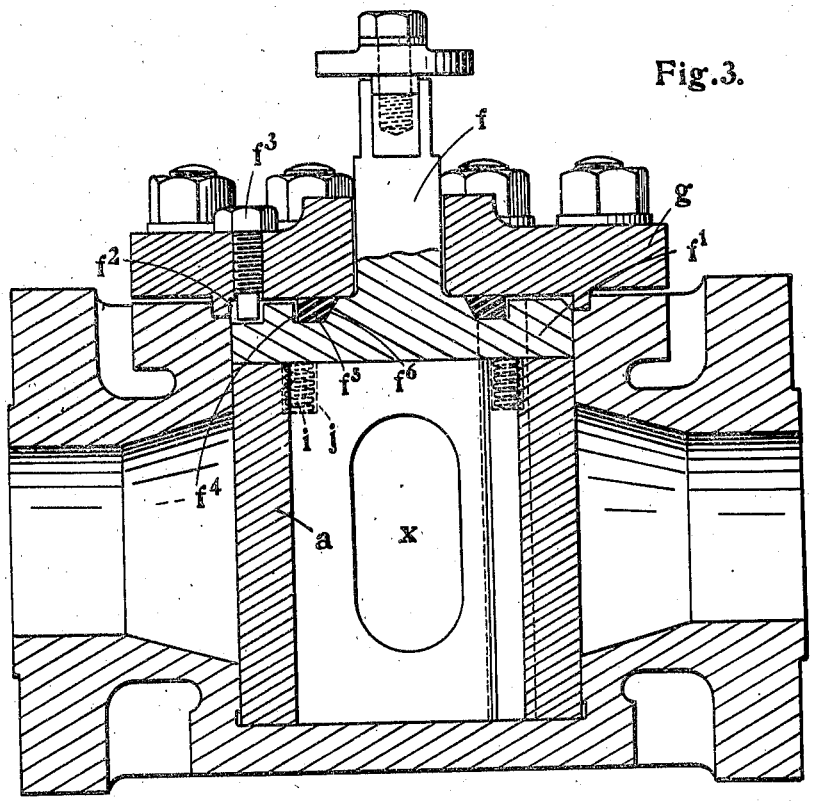
Figure 3 is a vertical section of a valve constructed according to the invention in the closed position.
Figure 4:
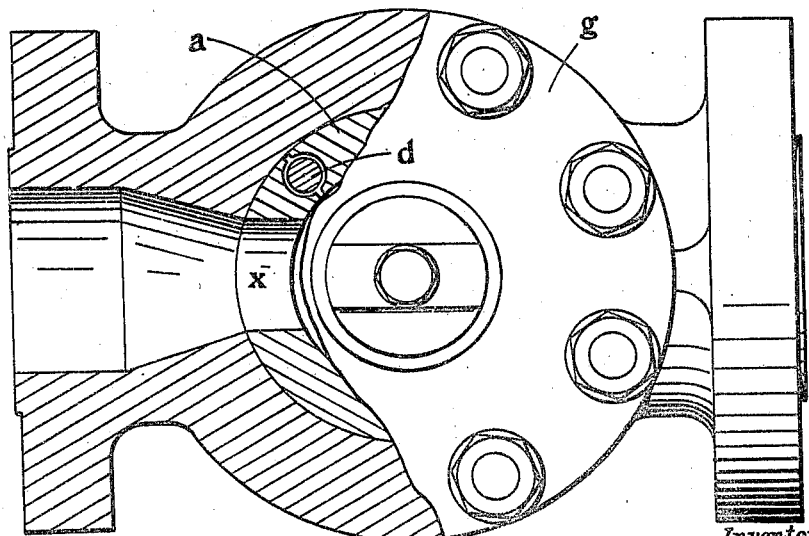
Figure 4 is a corresponding plan partly in section, in the open position.

The inlet and the outlet passages in the valve body may be disposed eccentrically to the longitudinal centre line of the valve body, whereby a greater extent of overlap is provided without increase in diameter of the valve; while the inlet and the outlet passages may, as illustrated at $x$ be of elongated form vertically and the width of the passages may be substantially smaller than the vertical dimension; or the passages may, as illustrated in Figures 3, 4 and 5, have inclined faces flaring outwardly from the valve cavity in the valve body towards the external faces of the respective inlet and outlet flanges of the body at which the passages may have a circular or other cross-sectional form corresponding to the internal diameter of the pipes intended for connection to them.

Helical springs $i$ are advantageously seated within vertical recesses $j$ spaced in the upper surfaces of the valve sleeve, whereby the valve sleeve is pressed downwardly within the valve body and the massive cap $f^1$ is pressed upwardly upon the packing ring $f^5$.

I claim:

1. A rotary valve in which the valve is a tubular sleeve slotted lengthwise from end to end, the opposite lengthwise faces of the slot being formed as complementary and coincident grooves, which together form a lengthwise cavity, a valve body having a cavity therein for the sleeve, of a form corresponding to the external form of the sleeve, a compressible spring device adapted for insertion within said lengthwise cavity and means for the compression of the spring device and its extension respectively for the circumferential contraction of the sleeve to permit of its free rotation, and for the circumferential expansion and immobilisation of the sleeve in the open, closed or other position in the valve body.

2. A rotary valve as specified in claim 1, comprising an externally operable and rotatable cap and spindle surmounting the sleeve, the cap being adapted in form at its lower part to inter-engage with the upper end of the sleeve for its rotation, and for extending or compressing the compressible spring device for expanding and immobilising the sleeve or for contracting it and permitting its free rotation.

3. A rotary valve as specified in claim 1, in which the spring device takes the form of a rod having at its upper end a compressible forked spring adapted for extension within the lengthwise cavity formed between the complementary and coincident grooves at the faces of the lengthwise slot in the sleeve, for the expansion and immobilisation of the sleeve, the said spring being also adapted for compression within said cavity at or near the upper end of the spring for contraction of the sleeve to permit of its free rotation within the valve body.

4. A rotary valve as specified in claim 1, in which the spring device takes the form of a rod having at its upper and lower ends a compressible forked spring adapted for extension within the lengthwise cavity formed by the complementary and coincident grooves at the faces of the lengthwise slot in the sleeve, whereby the sleeve may be expanded and immobilised in the position in the valve body in which it is set, and means by which the compressible forked spring may be compressed at or near its upper end, whereby the sleeve is contracted, and is freely rotatable in the cavity in the valve body.

5. A rotary valve as specified in claim 1, in which the sleeve has at its upper end at least two upwardly extending parts and interstitial cavities, the lengthwise slot in the sleeve being located in a plane passing through one of the said upwardly extending parts, a rotatable cap surmounting the sleeve, the spindle extending upward through the cover plate of the valve body, the cap having segmental cavities and interstitial parts at its underface adapted to inter-engage with the complementary upwardly extending segmental parts and cavities of the sleeve, the radial end faces of the segmental parts of the cap lying respectively adjacent the opposite lateral faces of that upstanding part through which the lengthwise slot extends, and a spring device in the form of a rod carrying at its upper end a forked spring located in said lengthwise slot, and a pair of pins each of a determined length set in transverse holes in alignment at the respective sides of the lengthwise slot, whereby on rotation of the valve spindle and cap in one direction one of the pins is caused to extend into the lengthwise slot and to contact and compress the forked spring, whereby the sleeve contracts and may be freely rotated, while on the rotation of the cap in the opposite direction the sleeve is expanded and immobilised in the valve body.

6. A rotary valve as specified in claim 1, comprising a rotatable cap depending from the valve spindle and surmounting the sleeve, the cap being so adapted in form as to engage the sleeve at its upper end for its rotation, the cap having at its top face an annular channel, the inner face of which is of a conical form inclining inwards to the top face of the cap towards the adjacent underface of the cover plate through which the valve spindle extends, while the outer face of the annular channel is perpendicular, and a packing ring within the annular recess, having a transverse radial cross-section generally corresponding in shape to that of the annular channel and having an external diameter substantially less than that of the diameter of the outer face of the annular channel, whereby an annular pressure space surrounds the packing ring.

7. A rotary valve as specified in claim 1, in which the extent of movement of the valve sleeve is determined by a segmental slot on a rotatable cap in which the lower end of a stud extends that is set in position on the cover plate of the valve body.

LEWIS MERVYN CECIL SEAMARK.